Inventor:
Earl E. Opel
By Williams, Bradbury & Hinkle
Attorneys.

June 19, 1951 E. E. OPEL 2,557,837
INDEXING TABLE FOR MACHINE TOOLS
Filed Sept. 14, 1945 4 Sheets-Sheet 2
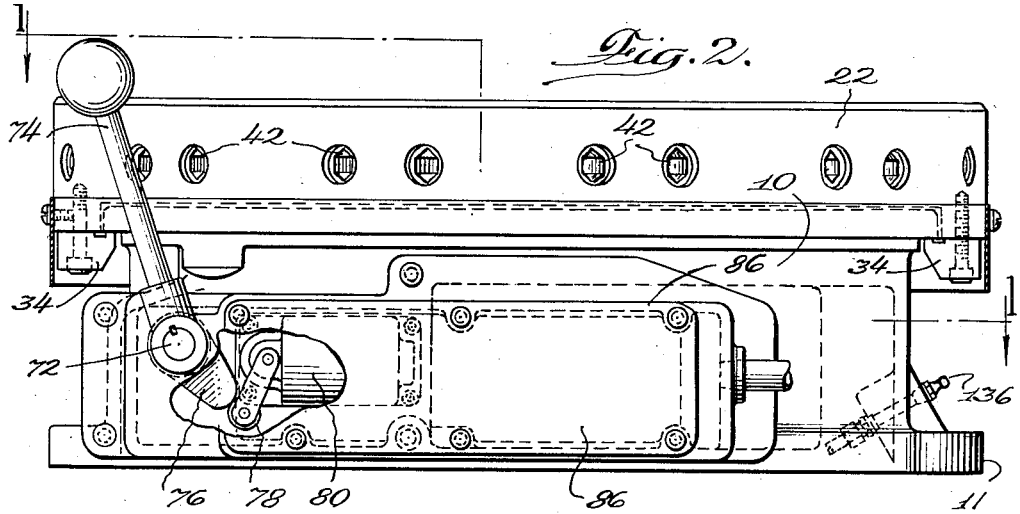
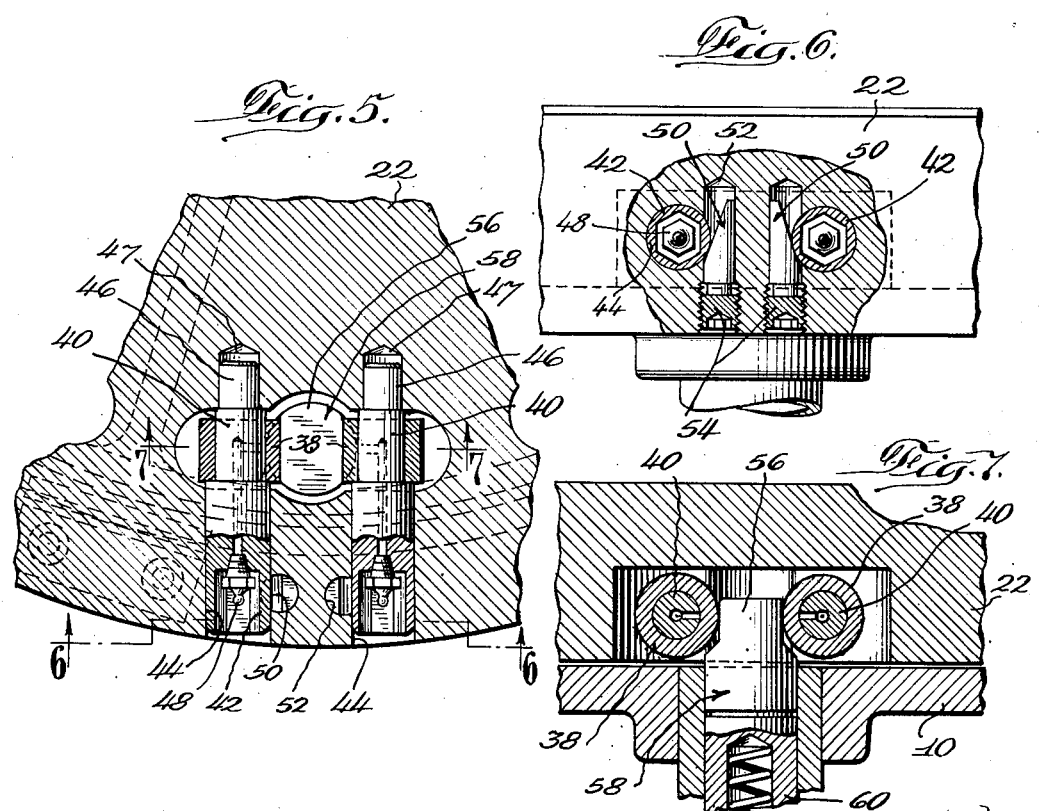
Inventor:
Earl E. Opel
By Williams, Bradbury & Hinkle
Attorneys

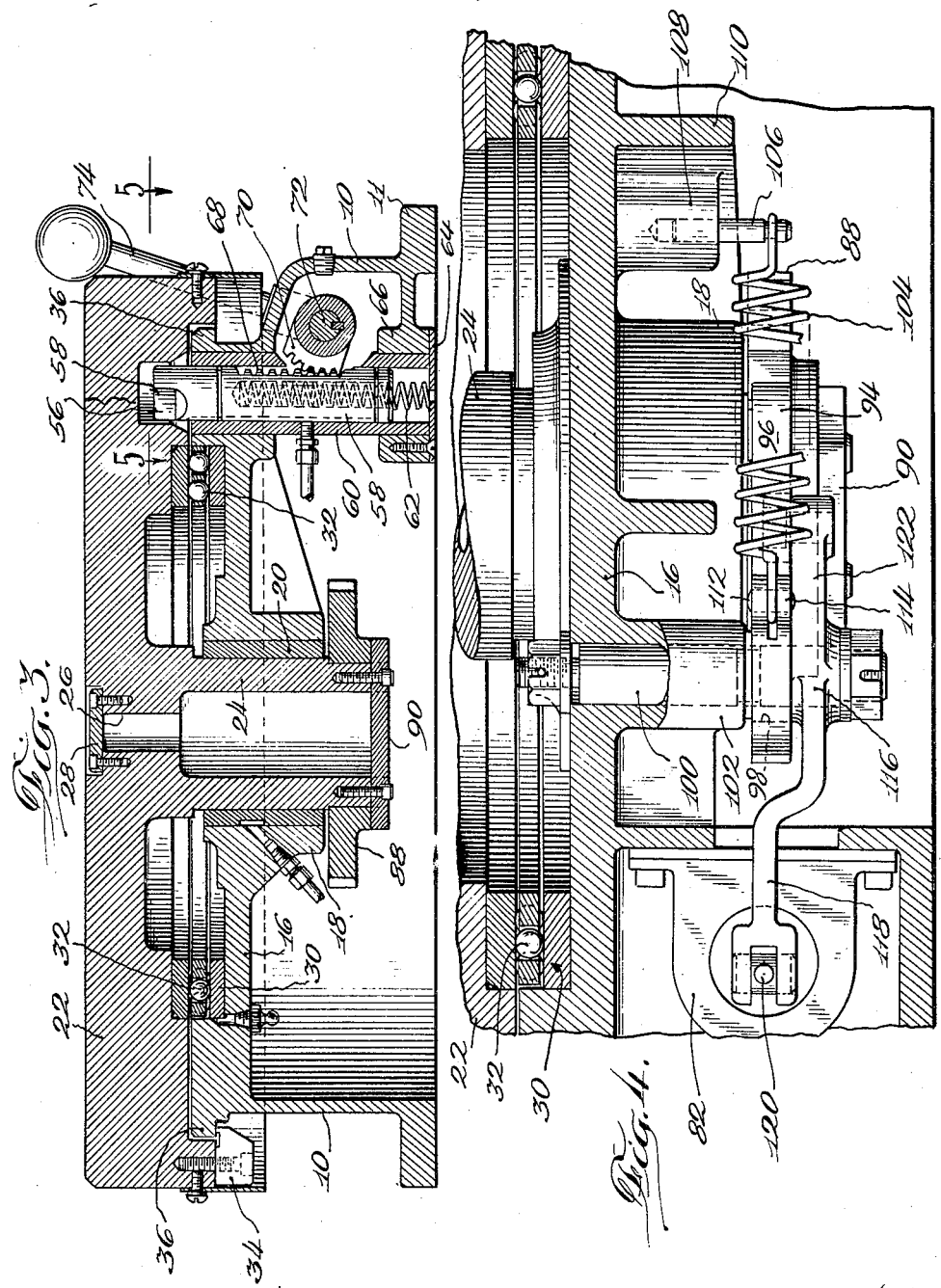

June 19, 1951 — E. E. OPEL — 2,557,837
INDEXING TABLE FOR MACHINE TOOLS
Filed Sept. 14, 1945 — 4 Sheets-Sheet 4

Inventor:
Earl E. Opel
By Williams, Bradbury & Hinkle
Attorneys

Patented June 19, 1951

2,557,837

UNITED STATES PATENT OFFICE 2,557,837

INDEXING TABLE FOR MACHINE TOOLS

Earl E. Opel, Richmond, Ind., assignor to National Automatic Tool Company, Inc., Richmond, Ind., a corporation of Indiana Application September 14, 1945, Serial No. 616,275

4 Claims. (Cl. 90—57)

My invention relates generally to indexing tables, and more particularly to a manually indexed and controlled table for machine tools, such as drill presses, tapping machines, boring machines, and the like.

It is the primary object of my invention to provide an improved manually operated indexing table having a number of safety controls to prevent misoperation.

A further object is to provide an improved indexing table having improved means for locating its indexing positions with a high degree of precision.

A further object is to provide an improved hand operated table with electrical means interlocking the machine tool to prevent indexing without completing a cycle of the tool head.

A further object is to provide an improved hand operated rotary indexing table which can be indexed in only one direction.

A further object is to provide an improved means for preventing operation of the machine tool unless the indexing table is locked in indexed position.

A further object is to provide an improved indexing table structure which will support eccentric loads without tipping, which is rugged but nevertheless operates with precision, and may be rotated with ease.

Other objects will appear from the following description, reference being had to the accompanying drawings, in which:

Fig. 2 is a side elevational view of the table, with portions of the guard ring broken away, and showing particularly the shot bolt operating lever and limit switch;

Fig. 3 is a vertical sectional view, taken on the line 3—3 of Fig. 1;

Fig. 4 is a fragmentary sectional view, taken on the line 4—4 of Fig. 1;

Fig. 5 is a fragmentary sectional view, taken on the line 5—5 of Fig. 3;

Figure 8:
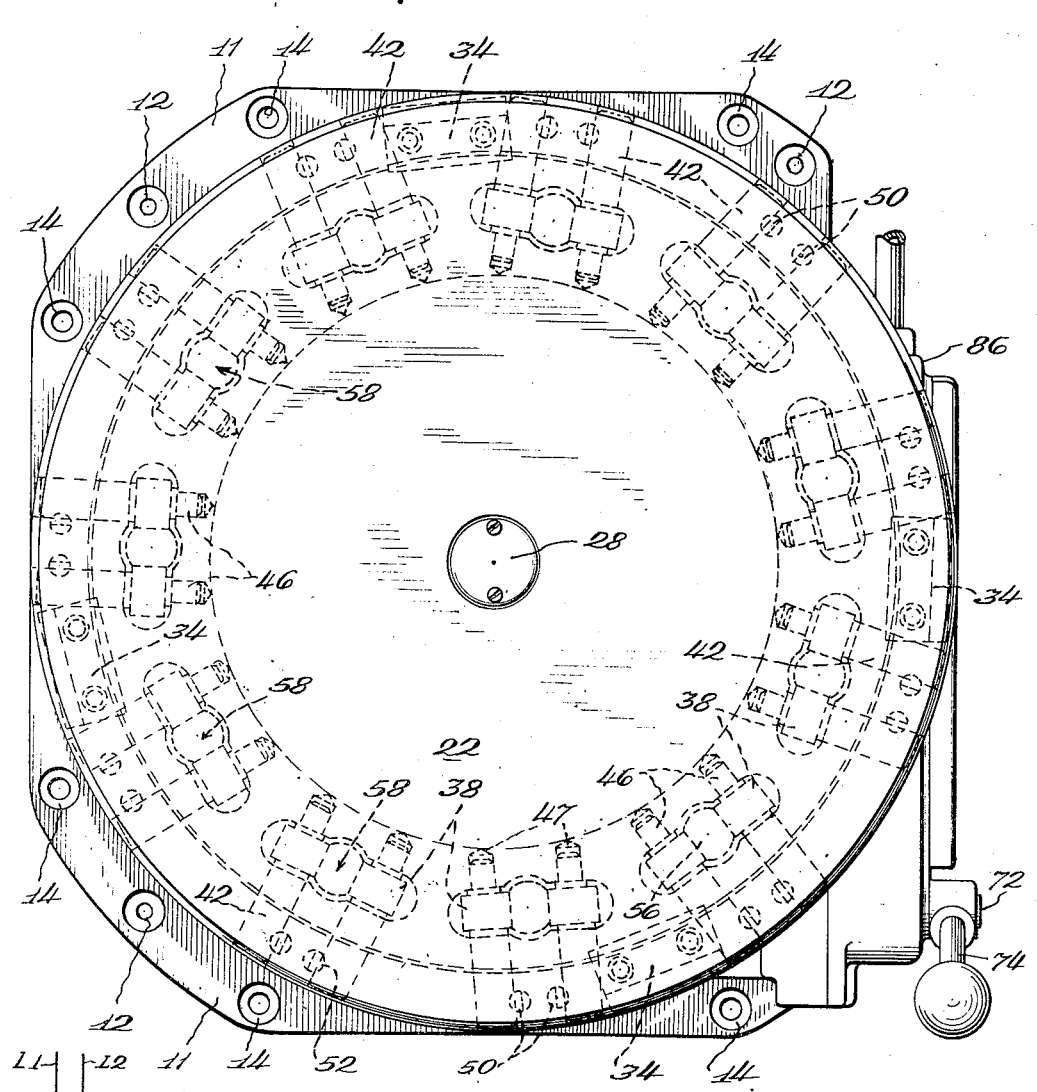
Figure 9:
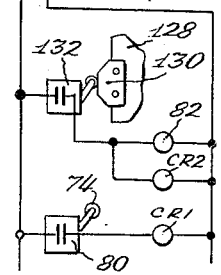

Figs. 6 and 7 are fragmentary vertical sectional views, taken on the lines 6—6 and 7—7, respectively, of Fig. 5;

Fig. 8 is a plan view of the complete table, showing the relative locations of the indexing stations; and Fig. 9 is a simplified circuit diagram showing the relationships of the electrical components.

As previously indicated, the indexing table is adapted to be used as a part of a drill press, tapping machine, or other machine tool. Such machine tools conventionally have a tool carrying head which is moved vertically, horizontally, or at an angle toward the work carried by the table, and is provided with electric controls, or combination electric and hydraulic controls.

The indexing table described herein is particularly adapted for use on a machine having a rapid reverse traverse limit switch which is closed only when the head is in the back position with the tools clear of the work, and is provided with a circuit which must be completed to cause movement of the head toward the work.

There are a large number of different kinds of machine tools to which the invention disclosed herein may be adapted readily, as, for example, the machine tools shown in Patent No. 2,380,873 dated July 31, 1945, and Patent No. 2,408,957 dated October 8, 1946.

The table comprises a flanged base 10 adapted to be located on the table or base of the machine tool by three tapered dowels projecting through holes 12 formed in the flange 11 of the table base 10, and secured thereto by six studs or bolts projecting through holes 14.

As best shown in Fig. 3, the base 10 is in the form of a hollow casting having a top portion 16 provided with a central depending board boss 18 provided with a bearing bushing 20. The indexing table 22 is in the form of a heavy casting sufficiently thick to be drilled and tapped for the reception of hold down screws for the fixture mounting plate. A center shaft 24 is cast integrally with the table 22 for accurately centering the table in the bearing bushing 20.

The indexing table 22 has a counterbored opening 26 which is normally covered by a removable plate 28, the upper end of this bore 26 being provided for centralizing the location of fixtures and the like which are provided with a central locating pin for engagement in the bore 26. The indexing table 22 and top 16 of the base 10 are formed to receive an anti-friction thrust bearing assembly 30 having a number of rows of ball bearings 32. This thrust bearing is of sufficiently rugged precision construction to enable the table to support heavy loads and yet permit the table to be rotated easily. Tilting of the indexing table 22 with respect to the base 10 is prevented not only by the large long central bearing provided between the shaft 24 and bushing 20, but also by a plurality of clamps 34 (Fig. 3) which are secured at the lower outer edge of the table, and bear lightly against the lower finished surface of an outwardly extending flange 36 of the top of the base.

The indexing table disclosed herein is designed to have eleven indexing positions. At each of these indexing positions, within suitable recesses in the table 22, there are located two rollers 38 mounted for free rotation upon eccentric portions 40 of pins 42. The pins 42 are mounted for rotation in parallel bores 44 and have coaxial end portions 46 bearing in suitable sockets 47 formed in the table 22. The pins 42 have hollow heads for the reception of a suitable wrench, and each of these pins is suitably drilled to provide a passageway for supplying lubricant to the bearing surface of the eccentric portion 40, the end of the passageway being tapped for a lubricant receiving fitting 48.

As best shown in Fig. 6, the pins 42 are adapted to be locked in adjusted position by wedges 50 slidable in bores 52 in the table 22, these wedges being adapted to be moved into wedging and locking engagement with the pins 42 by hollow head flat end screws 54.

Figure 1:
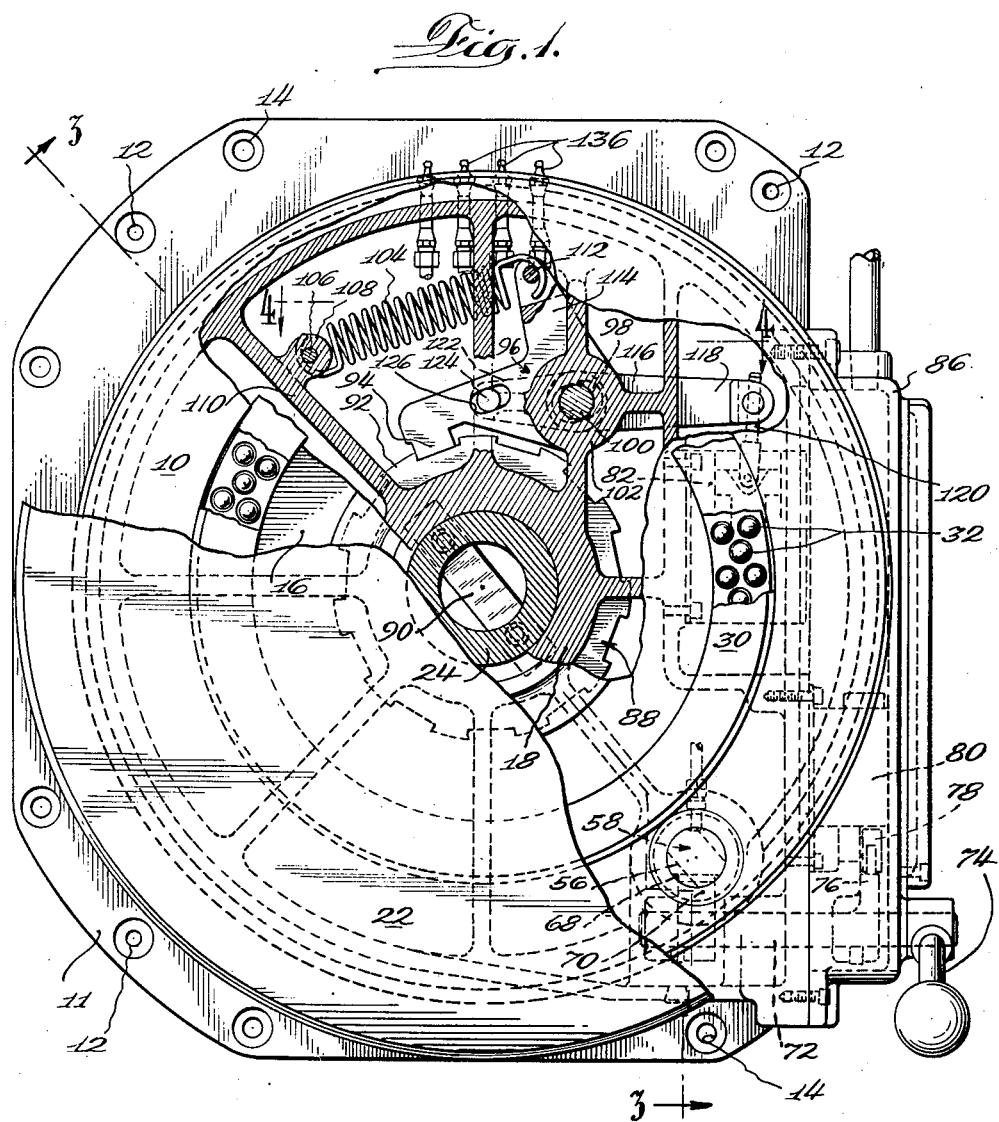
Fig. 1 is a plan view of the table with the portions of the rotatable table top and base being broken away more clearly to show parts of the operating mechanism.

The rollers 38 are hardened and ground, and are adapted to be engaged by the flattened end portion 56 of a shot bolt 58. This shot bolt, as best shown in Fig. 3, is guided for vertical reciprocation in a hardened and ground bushing 60 which is suitably secured in the base 10 and is urged upwardly by a compression coil spring 62 extending into a suitable bore formed in the lower end of the shot bolt. The spring 62 rests upon a plate 64 secured to a suitably formed boss 66 on the base 10. The shot bolt 58 has a rack 68 formed thereon for engagement with a segmental gear 70 keyed to a handle shaft 72. A ball end operating handle 74 is suitably keyed to the shaft 72. The shaft 72 also has a cam arm 76 keyed thereto for engagement with the roller 78 of a limit switch 80. The limit switch 80, as well as a solenoid 82 (Fig. 1) are covered by a housing 86 to provide waterproof protection for these parts.

A notched plate 88 is rigidly secured to the lower end of the central shaft portion 24 of the index table 22 by a bar 90 which extends through registering notches formed both in the lower end of the shaft portion 24 and in the hub portion of the notched plate 88. In the illustrated embodiment, the plate 88 has eleven teeth 92, the spaces between the teeth being adapted to be engaged by the locking pawl portion 94 of a bell crank 96. This bell crank has an elongated slot 98 which provides for pivotal and limited sliding movement of the bell crank with respect to a bearing stud 100 (Fig. 4) upon which it is mounted.

The bearing stud 100 is suitably secured in a boss 102 forming part of the top portion 16 of the base 10. A tension spring 104 has one end hooked to a pin 106 secured in a boss 108 projecting from a reinforcing web 110 of the base 10, while its other end is hooked around a pin 112 and projects in a suitable slot formed into the arm 114 of the bell crank lever 96. The stud 100 also provides a bearing for a lever 116, one arm 118 of which is pivotally secured to the plunger 120 of solenoid 82, while the other arm 122 of the lever 116 has a pin 124 which extends upwardly through an elongated slot 126 formed in the bell crank lever 96.

It will thus appear that when the solenoid 82 is energized, the lever 116 will be pivoted clockwise (Fig. 1) against the force of the tension spring 104, to remove the locking pawl portion 94 of the bell crank 96 from the notch between the teeth 92 of the notched plate 88. As soon as this occurs, the spring 104 slides the bell crank lever 96 to the left (Fig. 1) so as to permit the pawl 94 to rest upon the adjacent tooth 92.

From a consideration of the apparatus described thus far, it is clear that the table cannot be rotated even though the shot bolt 58 is lowered, unless the pawl portion 94 is raised from the notches or spaces between the teeth 92 of the plate 88, and this can be accomplished only by the energization of the solenoid 82.

Referring to Fig. 9, there is diagrammatically illustrated in abbreviated form, a portion of the head 128 which carries a dog or cam 130 for the operation of a limit switch 132. The machine tool head, the means for reciprocating it, and the associated controls, may be of the type more fully disclosed in the aforesaid Patents Nos. 2,380,873 and 2,408,957. The dog 130 closes the switch 132 to cause commencement of the rapid reverse traverse of the head 128 after the tools, such as the drills and taps, have completed the cutting operation. Closing of this switch completes parallel circuits from line conductor L1 through the solenoid 82 and control relay CR2 to line L2. Energization of CR2, through operation of its contactors (not shown in Fig. 9) effects the rapid reverse traverse of the head.

Energization of the solenoid 82 releases the pawl 94 from the notch in the plate 88 and the pawl is pulled to the left (Fig. 1) by the spring 104 so as to rest against the face of the adjacent tooth 92, thus putting the table in condition for manual indexing.

To index the table, the operator swings the handle 74 counterclockwise (Fig. 3), thereby withdrawing the shot bolt 58. The table 22 is then rotated in a clockwise direction (Fig. 1) until the pawl 94 drops into the next notch between the teeth 92. This will thus arrest the table at closely approximate the next indexing position. The operator will then swing the handle 74 clockwise (Fig. 3) to force the shot bolt into the space between the next pair of rollers 38, and in so doing move the table into the next indexing position with a high degree of precision.

It will be noted from the diagram of Fig. 9 that when the shot bolt is moved to its lowered position, the switch 80 associated therewith is opened, and thereby opens the circuit through a control relay CR1. Through the opening of contacts forming part of this relay, the necessary circuits for controlling the movement of the head are opened so that it is impossible to cause movement of the head while the shot bolt is disengaged from the table 22. It is only after the shot bolt has again been moved to table locking position that the switch 80 is closed, CR1 energized, and the circuits controlling the movement of the head again conditioned for effective control of the machine operating cycle.

It will thus be seen that although the table is manually indexed, it is interlocked with the machine control circuits so that it is impossible for the workman to commence indexing the table until after the head has commenced its rapid reverse traverse, and it is impossible for the workman to cause a downward movement of the tool carrying head until the table has been locked in indexed position.

In the event that the workman inadvertently moves the table counterclockwise, the pawl 94 will reenter the notch of the plate 88 from which it was released, and the table will then be locked. Under these conditions, it can be repositioned accurately in the position from which it was released, or it may be released by manual operation of the limit switch 132. If desired, a conveniently located push button switch may be connected in parallel with the limit switch 132 for this purpose.

Since the positions of the hardened and ground rollers 38 may be adjusted with a high degree of precision by rotation of their pins 42, and the latter may be locked in position by the wedges 58, the indexing positions may be determined with a very high degree of accuracy and with great facility. This adjustment not only assures that the shot bolt will lock tightly with the table, but also permits a limited adjustment of the effective positions of the pair of rollers 38, so that the indexing positions may be angularly spaced with exactness.

Provision is made for the lubrication of all of the bearings, and such bearings as are not readily accessible have conduits leading therefrom to lubricant receiving fittings 136 to which a grease gun may readily be applied.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In an indexing mechanism, the combination of a stationary part and a part to be rotated successively to a plurality of index positions, a member having a plurality of teeth corresponding in number to the number of index positions and secured to one of said parts, a locking pawl, means mounting the pawl for rotational and limited sliding movement on the other of said parts, said pawl having a lock portion engageable between the teeth of said toothed member to prevent substantial movement of the rotatable part, means to disengage the lock portion of said pawl from the teeth of said toothed member, resilient means to slide said pawl in a direction to cause its lock portion to rest on the peripheral face of the next adjacent tooth of the toothed member and thereafter to cause the lock portion of the pawl to enter one of the next adjacent spaces between the teeth on the toothed member and hold the toothed member against substantial angular movement after the rotated part has been turned through a sufficiently great angle in either direction, and means for locking said rotatable part against rotation.

2. A work holder comprising a base, a rotary workpiece carrying table adapted to move workpieces to successive stations by rotation of the table, and means to lock the worktable at its various stations, comprising a shot bolt reciprocable in the base of the machine, and a plurality of sockets in the table, one at each station, each of said sockets including a pair of pins having eccentric portions thereon rotatably mounted in the table in spaced parallel relation, a roller mounted for rotation on the eccentric portion of each of said pins, and wedge means for locking said pins in any rotary position of adjustment thereof.

3. A work holder comprising a rotary indexing table and a base supporting the table for rotation, a reciprocable shot bolt mounted in the base and having a pair of opposed relatively flat surfaces, a pair of pins mounted for rotation in the table and each having an eccentric portion, a roller mounted on the eccentric portion of each of said pins, whereby the axis of rotation of either or both of said rollers may be adjusted by rotation of said pins to vary the spacing between the faces of the rollers and to vary the position of the space between the faces of the rollers with respect to the table, the spacing of the faces of said rollers being adjusted to cause the faces thereof to engage the flat surfaces of the shot bolt when the latter is projected between the rollers to lock the table in indexed position, and means to lock said pins in adjusted angular positions.

4. An indexing mechanism including a base, a work piece supporting table mounted for rotation on the base, a toothed member providing a plurality of toothed spaces and secured to the table, a pawl having a tooth portion engageable with a tooth space of said member, means mounting said pawl for rotary motion and for sliding movement including means for limiting the extent of sliding movement, a solenoid, an operating connection between said solenoid and said pawl to swing said pawl in a direction to cause disengagement of the latter from the toothed member, resilient means to move the pawl in a direction to cause the tooth portion to overlie an adjacent tooth of the toothed member whereby the pawl will be in position to engage in the next adjacent tooth space of said toothed member upon forward rotation of the table through an angle representing substantially the angular spacing of the work stations of the indexing table and to limit rotation of the indexing table to compel the operator to index the work table only from one station thereof to the next adjacent work station in the forward direction only, means to lock the table in any one of its index positions, and said limiting means being constructed to limit movement of said pawl to an extent less than the distance between adjacent tooth spaces and sufficient to locate said table for engagement of said locking means.

EARL E. OPEL.

REFERENCES CITED

The following references are of record in the file of this patent:

UNITED STATES PATENTS

| Number | Name | Date |
| --- | --- | --- |
| 353,821 | Richards | Dec. 7, 1886 |
| 1,446,829 | Burrell et al. | Feb. 27, 1923 |
| 1,675,150 | Andrew | June 26, 1928 |
| 1,780,083 | Kingsbury | Oct. 28, 1930 |
| 1,827,302 | Stull | Oct. 13, 1931 |
| 1,925,384 | Hoern | Sept. 5, 1933 |
| 1,956,883 | Verderber | May 1, 1934 |
| 1,975,007 | Kingsbury | Sept. 25, 1934 |
| 2,053,400 | Kingsbury | Sept. 8, 1936 |
| 2,068,084 | Stahlhammer | Jan. 19, 1937 |
| 2,239,260 | Turrettini | Feb. 3, 1940 |
| 2,352,489 | Melin | June 27, 1944 |
| 2,376,137 | Hallowell | May 15, 1945 |
| 2,380,873 | Schafer et al. | July 31, 1945 |